US012720563B2

(12) United States Patent
Sridharan et al.

(10) Patent No.: US 12,720,563 B2
(45) Date of Patent: Aug. 25, 2026

(54) SINGLE DCI SCHEDULING MULTIPLE PDSCH OR PUSCH FOR SUB-BAND FULL DUPLEX COMMUNICATIONS

(71) Applicant: QUALCOMM Incorporated, San Diego, CA (US)

(72) Inventors: Gokul Sridharan, Sunnyvale, CA (US); Muhammad Sayed Khairy Abdelghaffar, San Jose, CA (US); Abdelrahman Mohamed Ahmed Mohamed Ibrahim, San Diego, CA (US); Thomas Valerrian Pasca Santhappan, San Diego, CA (US); Hung Dinh Ly, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 602 days.

(21) Appl. No.: 18/171,275

(22) Filed: Feb. 17, 2023

(65) Prior Publication Data

US 2024/0284476 A1 Aug. 22, 2024

(51) Int. Cl.
*H04W 72/232* (2023.01)
*H04L 5/14* (2006.01)

(52) U.S. Cl.
CPC ............. *H04W 72/232* (2023.01); *H04L 5/14* (2013.01)

(58) Field of Classification Search
CPC ..... H04L 5/001; H04L 5/0044; H04L 5/0046; H04L 5/0053; H04L 5/0092; H04L 5/0094; H04L 5/14; H04L 5/1461; H04W 72/232
See application file for complete search history.

(56) References Cited

U.S. PATENT DOCUMENTS 11,206,705 B2 * 12/2021 Chow .................. H04W 72/52
11,848,897 B2 * 12/2023 Huang ...................... H04L 5/14
(Continued)

FOREIGN PATENT DOCUMENTS

WO WO-2021145996 A1 * 7/2021 ............... H04L 5/14
WO WO-2021226506 A1 * 11/2021 ............ H04W 72/23
(Continued)

OTHER PUBLICATIONS

International Search Report and Written Opinion—PCT/US2024/012158—ISA/EPO—Oct. 22, 2024.
(Continued)

*Primary Examiner* — Eric Nowlin
(74) *Attorney, Agent, or Firm* — Holland & Hart LLP

(57) ABSTRACT

Various aspects of the present disclosure generally relate to wireless communication. There is provided method for wireless communication performed by a user equipment, UE, comprising: receiving a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and communicating, with a network entity, in accordance with the received indication.

30 Claims, 12 Drawing Sheets

(56) References Cited

U.S. PATENT DOCUMENTS

| | | | | |
|---|---|---|---|---|
| 2020/0029377 | A1* | 1/2020 | Chow | H04W 76/15 |
| 2021/0152418 | A1* | 5/2021 | Abdelghaffar | H04B 7/0602 |
| 2021/0320779 | A1* | 10/2021 | Huang | H04L 5/14 |
| 2021/0352667 | A1* | 11/2021 | Abotabl | H04W 72/0446 |
| 2021/0368459 | A1* | 11/2021 | Zhang | H04L 5/0094 |
| 2021/0377995 | A1* | 12/2021 | Fakoorian | H04L 1/001 |
| 2022/0007395 | A1* | 1/2022 | Lei | H04L 1/0003 |
| 2022/0078867 | A1* | 3/2022 | Chow | H04W 72/0453 |
| 2022/0104245 | A1 | 3/2022 | Xu et al. | |
| 2023/0044521 | A1* | 2/2023 | Abotabl | H04B 1/401 |
| 2024/0155619 | A1* | 5/2024 | Yoshimura | H04W 72/23 |
| 2024/0389111 | A1* | 11/2024 | Yang | H04L 1/1819 |
| 2025/0220650 | A1* | 7/2025 | Zhao | H04L 5/0053 |
| 2026/0025804 | A1* | 1/2026 | Gao | H04L 5/0053 |
| 2026/0031964 | A1* | 1/2026 | Khan Beigi | H04L 5/0053 |

FOREIGN PATENT DOCUMENTS

| | | | | |
|---|---|---|---|---|
| WO | WO-2021237231 | A1 * | 11/2021 | H04L 5/0094 |
| WO | WO-2022008788 | A1 * | 1/2022 | H04W 24/02 |
| WO | WO-2024073330 | A1 * | 4/2024 | H04W 72/1268 |
| WO | WO-2025159514 | A1 * | 7/2025 | H04W 72/23 |

OTHER PUBLICATIONS

Mediatek Inc: "Discussion on Subband Non-Overlapping Full Duplex for NR", 3GPP TSG RAN WG1 Meeting #110, R1-2206984, 3rd Generation Partnership Project (3GPP), Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 10 Pages, XP052274921, Section 2.2.3.2.

Mediatek Inc: "Discussion On Subband Non-overlapping Full Duplex For NR", 3GPP TSG RAN WG1 Meeting #111, R1-2212249, 3rd Generation Partnership Project, Mobile Competence Centre, 650, Route Des Lucioles, F-06921 Sophia-Antipolis Cedex, France, vol. 3GPP RAN 1, No. Toulouse, France, Nov. 14, 2022-Nov. 18, 2022, 16 Pages, Nov. 7, 2022, XP052222808, Sections 2.3, 2.4.3.1, 2.4.3.2.

NEC: "Discussion On Subband Non-overlapping Full Duplex", 3GPP TSG-RAN1 #111, R1-2211748, 3rd Generation Partnership Project, Mobile Competence Centre, 650, Route Des Lucioles, F-06921 Sophia-Antipolis Cedex, France, vol. RAN WG1, No. Toulouse, France, Nov. 14, 2022-Nov. 18, 2022, 15 Pages, Nov. 7, 2022, XP052222313, Section 2.4.

NTT Docomo Inc: "Discussion on Subband Non-overlapping Full Duplex", 3GPP TSG RAN WG1 #110bis-e, R1-2209902, 3rd Generation Partnership Project, Mobile Competence Centre, 650, Route Des Lucioles, F-06921 Sophia-Antipolis Cedex, France, vol. RAN WG1, No. e-Meeting, Oct. 19, 2022-Oct. 19, 2022, Sep. 30, 2022, 17 Pages, XP052259375, pp. 9,10.

* cited by examiner

500

= Downlink

= Uplink

505

510

515

FDRA1

FDRA1

FDRA1

FDRA2

DL Slot

SBFD Slot

SBFD Slot

SBFD Slot

UL Slot

= Downlink

= Uplink

605

610

615

REP 1

REP 2

REP 3

REP 4

DL Slot

SBFD Slot

SBFD Slot

SBFD Slot

UL Slot

SINGLE DCI SCHEDULING MULTIPLE PDSCH OR PUSCH FOR SUB-BAND FULL DUPLEX COMMUNICATIONS

FIELD OF THE DISCLOSURE

Aspects of the present disclosure generally relate to wireless communication, and more specifically, to techniques and apparatuses associated with a single DCI scheduling multiple PDSCH or PUSCH for sub-band full duplex communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

As described herein with reference to the appended claims there is provided methods and apparatus for wireless communication.

According to an aspect there is provided a method for wireless communication performed by a user equipment, UE, comprising: receiving a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and communicating, with a base station, the plurality of TBs over the plurality of slots including at least one of the SBFD slot or the uplink slot, in accordance with the received indication.

Each of the plurality of transmissions may be a physical uplink shared channel, PUSCH, transmission or a physical downlink shared channel, PDSCH, transmission.

Accordingly, a single DCI is provided which schedules multiple transmissions across transport blocks, thus improving resource usage. Single DCI scheduling of multiple PDSCH/PUSCH in SBFD deployment allows for improved system capacity and flexibility improvements in a wireless communication system.

The indication may comprise a FDRA bitfield and wherein a value of the bitfield maps to an associated FDRA pattern in a FDRA table of FDRA patterns.

The indication may comprise two FDRA bitfields, wherein a first FDRA bitfield of the two FDRA bitfields may comprise an indication of the first FDRA for the SBFD slot, and a second FDRA bitfield of the two FDRA bitfields may comprise an indication of the second FDRA for the uplink slot.

A first slot of the plurality of slots may be an SBFD slot and the first FDRA may be for a sub-band associated with the first slot, and wherein the method may comprise determining available frequency resources in the sub-band.

Communicating with the network entity in accordance with the received indication may comprise dropping a transmission of the plurality of transmissions associated with the first slot based on a determination that the available frequency resources in the sub-band associated with the first slot are insufficient for the transmission.

Communicating, with the network entity, in accordance with the received indication, may comprise determining a new FDRA based on the first FDRA and an overlap of the first FDRA with available frequency resources in the sub-band.

In one configuration a first slot of the plurality of slots may be an SBFD slot and the first slot may be associated with a first sub-band and a second sub-band, the first FDRA being allocated for the first sub-band, wherein the second sub-band of the slot may be configured with a Random Access Channel, RACH, occasion, RO, and wherein communicating, with the network entity, in accordance with the received indication, may comprise transmitting a physical downlink shared channel, PDSCH, transmission in the first sub band.

In a configuration a first slot of the plurality of slots is an SBFD slot, the first slot comprises a first sub-band and a second sub-band, the second sub-band being configured with a synchronization signal block, and wherein communicating, with the network entity, in accordance with the received indication may comprise transmitting a physical uplink shared channel, PDSCH, transmission.

Accordingly, it will be appreciated that collisions in time are accommodated.

In a further configuration, there is provided a method for wireless communication performed by a user equipment, UE, comprising: receiving a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and communicating, with a base station, the plurality of TBs over the plurality of slots including at least one of the SBFD slot or the uplink slot, in accordance with the received indication.

Each of the plurality of transmissions may be a physical uplink shared channel, PUSCH, transmission or a physical downlink shared channel, PDSCH, transmission.

The indication may comprise a first MCS and a delta value for a second MCS, the delta value being associated with a difference between the first MCS and the second MCS. The indication may comprise a plurality of MCS bitfields, and wherein each of the plurality of MCS bitfields maps to a respective TB of the plurality of TBs.

The indication may comprises two MCS bitfields, and wherein a first MCS bitfield of the two MCS bitfields may comprise an indication of the first MCS for the SBFD slot and a second MCS bitfield of the two MCS bitfields comprises an indication of the second MCS for the uplink slot of the plurality of slots.

In a further configuration there is provided a user equipment for wireless communication, comprising: means for receiving a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and means for communicating, with a base station, in accordance with the received indication.

Each of the plurality of transmissions may be a physical uplink shared channel, PUSCH, transmission or a physical downlink shared channel, PDSCH, transmission.

The indication may comprise a FDRA bitfield and wherein a value of the bitfield maps to an associated FDRA pattern in a FDRA table of FDRA patterns.

The indication may comprise two FDRA bitfields, wherein a first FDRA bitfield of the two FDRA bitfields comprises an indication of the first FDRA for the SBFD slot, and a second FDRA bitfield of the two FDRA bitfields comprises an indication of the second FDRA for the uplink slot.

A first slot of the plurality of slots may be an SBFD slot and the first FDRA may be for a sub-band associated with the first slot, and wherein the method comprises determining available frequency resources in the sub-band.

Communicating with the network entity in accordance with the received indication may comprise dropping a transmission of the plurality of transmissions associated with the first slot based on a determination that the available frequency resources in the sub-band associated with the first slot are insufficient for the transmission; or wherein communicating, with the network entity, in accordance with the received indication may comprise determining a new FDRA based on the first FDRA and an overlap of the first FDRA with available frequency resources in the sub-band.

In a configuration a first slot of the plurality of slots is an SBFD slot and the first slot is associated with a first sub-band and a second sub-band, the first FDRA being allocated for the first sub-band, wherein the second sub-band of the slot may be configured with a Random Access Channel, RACH, occasion, RO, and wherein communicating, with the network entity, in accordance with the received indication, may comprise transmitting a physical downlink shared channel, PDSCH, transmission in the first sub band.

In a configuration, a first slot of the plurality of slots is an SBFD slot, the first slot comprises a first sub-band and a second sub-band, the second sub-band being configured with a synchronization signal block, and wherein communicating, with the network entity, in accordance with the received indication may comprise transmitting a physical uplink shared channel, PDSCH, transmission.

In a further embodiment there is provided a user equipment for wireless communication, comprising: means for receiving a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; means for communicating, with a base station, the plurality of TBs over the plurality of slots including at least one of the SBFD slot or the uplink slot, in accordance with the received indication.

Each of the plurality of transmissions may be a physical uplink shared channel, PUSCH, transmission or a physical downlink shared channel, PDSCH, transmission.

The indication may comprise a first MCS and a delta value for a second MCS, the delta value being associated with a difference between the first MCS and the second MCS.

The indication may comprise a plurality of MCS bitfields, and wherein each of the plurality of MCS bitfields maps to a respective TB of the plurality of TBs.

In a further configuration, there is provided a method for wireless communication performed by a base station, comprising: transmitting a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and communicating, with a user equipment, over the plurality of slots including at least one of the SBFD slot or the uplink slot, in accordance with the transmitted indication.

In a further configuration, there is provided a method for wireless communication performed by a base station, comprising: transmitting a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and communicating, with a user equipment, over the plurality of slots including at least one of the SBFD slot or the uplink slot, in accordance with the transmitted indication.

In a further embodiment, there is provided a base station, comprising means for transmitting a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and means for communicating, with a user equipment, over the plurality of slots including at least one of the SBFD slot or the uplink slot, in accordance with the transmitted indication.

A further embodiment provides a base station, comprising: means for transmitting a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and means for communicating, with a user equipment, over the plurality of slots including at least one of the SBFD slot or the uplink slot, in accordance with the transmitted indication.

Features and sub-features of the method and computer-readable medium aspects may be applied to the apparatus aspects and vice versa. An apparatus or computer-readable medium according to preferred embodiments of the present invention may comprise any combination of the method aspects. Methods or computer-readable mediums according to further embodiments may be described as computer-implemented in that they require processing and memory capability. Aspects relating to computer-readable mediums may also be considered as computer programs. For example, according to an embodiment of an aspect there is provided a computer program which when executed carries out a method for wireless communication according to an embodiment of an aspect of the invention. The computer-readable medium may be a non-transitory computer-readable medium.

The apparatus according to preferred embodiments is described as configured or arranged to or simply 'to' carry out certain functions. This configuration or arrangement could be by use of hardware or middleware or any other suitable system. The apparatus may comprise one or more processors and processes of the apparatus may be performed by a single processor or by multiple processors in combination. A single processor may therefore perform one or more of the processes of the apparatus. The memory and the one or more processors are communicably connected, for example, via a bus. The one or more processors may store and retrieve information from the memory, such as for example, intermediate data generated when performing the processes of the apparatus.

Aspects of the invention may be implemented in digital electronic circuitry, or in computer hardware, firmware, software, or in combinations of them. Aspects of the invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a standalone program or as a module, component, subroutine, or other unit suitable for use in a data processing environment. A computer program may be deployed to be executed on one module or on multiple modules at one site or distributed across multiple sites and interconnected by a communication network.

Method steps according to aspects of the invention may be performed by one or more programmable processors executing a computer program to perform functions of the invention by operating on input data and generating output. An apparatus according to aspects of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention may be performed in a different order and still achieve desirable results.

Elements of the invention have been described using the terms "memory", "processor", etc. The skilled person will appreciate that such terms and their equivalents may refer to parts of the system that are spatially separate but combine to serve the functions defined. Equally, the same physical parts of the system may provide two or more of the functions defined. For example, separately defined means may be implemented using the same memory and/or processor as appropriate.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope, which is defined in the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

Embodiments of the invention will be described, by way of example only, with reference to the accompanying drawings in which:

FIG. 5 depicts a sample frequency domain resource allocation in accordance with an embodiment of the present disclosure.

FIG. 6 depicts a sample frequency domain resource allocation in accordance with an embodiment of the present disclosure.

DETAILED DESCRIPTION

Figure 1:
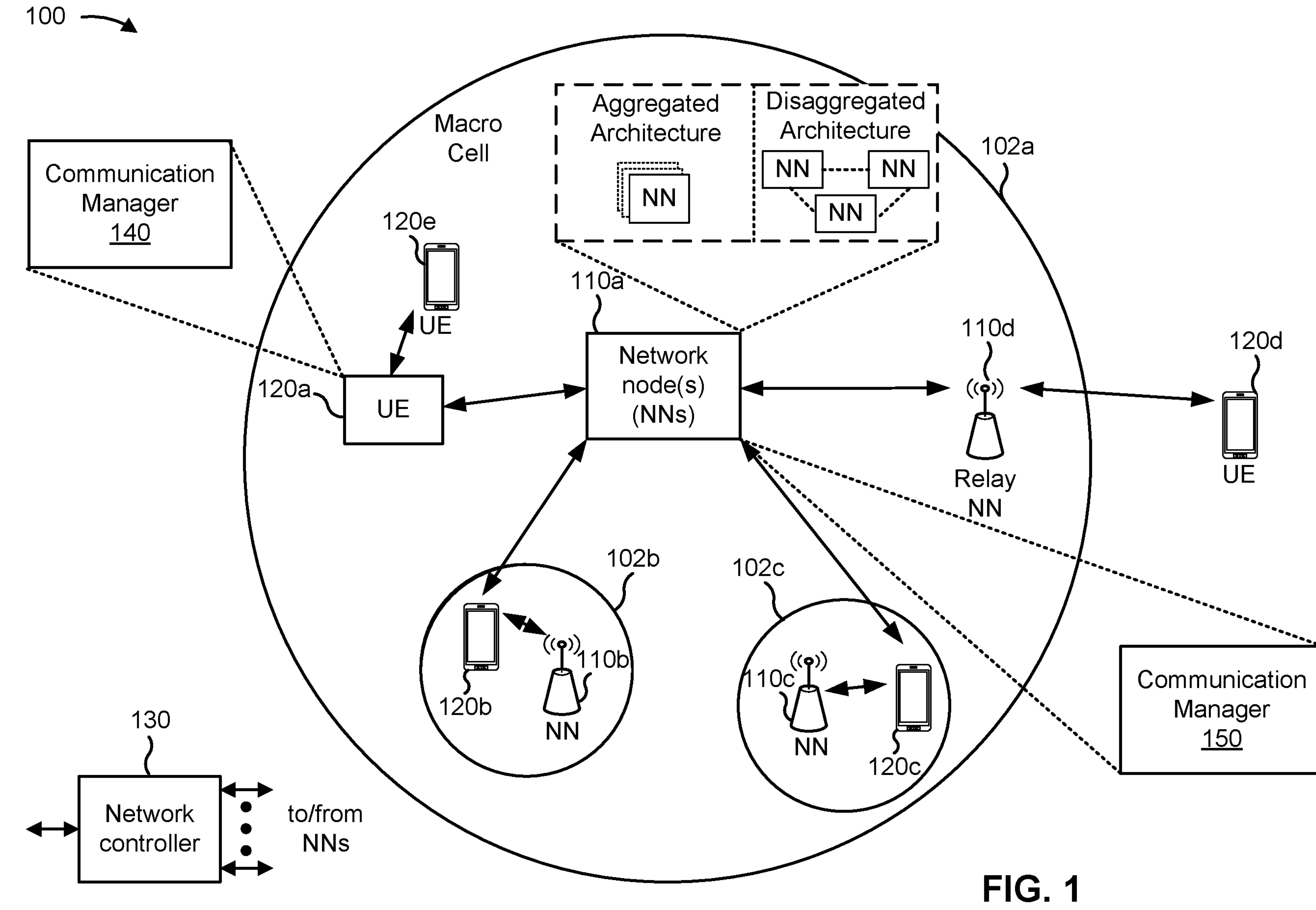
FIG. 1 is an example of a wireless network, in accordance with an embodiment of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Various aspects relate generally to wireless communication and more specifically to downlink control information for physical layer control messages. In NR and LTE systems, a network node may use downlink control information, DCI, to send physical layer control messages to UEs. The information included in DCI can be system-wide or UE-specific and may include information associated with uplink or downlink data scheduling, hybrid automatic repeat request (HARQ) information, power control commands or other signaling. The NR standards define a number of different DCI formats, each serving a different usage. For example, DCI Format 0_0 and DCI Format 0_1 are used for the scheduling of physical uplink shared channel (PUSCH) communications in a cell. Similarly, DCI Format 1_0 and DCI 1_1 are used for the scheduling of physical downlink shared channel (PDSCH) communications. DCI 1_2 is a compact DCI format. While discussed herein in relation to DCI 1_1 it will be appreciated that the methods described herein may equally be applicable to DCI 1_0 and DCI 1_2 (Compact DCI for PDSCH)

DCI enhancements to support multi-PDSCH/PUSCH scheduling have been previously proposed with the use of a single DCI to schedule both PDSCH and PUSCH. Previously, a modified Time Domain Resource Allocation (TDRA) table has been proposed where the TDRA table is extended such that each row indicates multiple PDSCH/PUSCH. Extending a TDRA table allows a DCI to indicate single or multiple PDSCH/PUSCH in any slot of multiple scheduled slots. In some examples, the maximum number of PDSCH/PUSCHs that can be configured in an extended row of a TDRA table is 8. For each TDRA option (e.g., each row) the columns of the table includes various parameters defining the details of the resource allocation. For example, each TDRA option (e.g., each row), the table defines a Row index, a mapping type, a slot offset (K0/K2), a starting symbol (S) and an allocation length L. The slot offset K2 provides an offset relative to the slot in which the DCI was transmitted. For example, if n represents the slot in which the scheduling DCI was transmitted, PUSCH/PDSCH is transmitted in slot n+K2. The starting symbol S specifies the particular symbol of a slot (e.g., symbol 0, 1, 2 . . . 14) at which the corresponding PUSCH/PDSCH transmission is scheduled to start. The allocation length L defines a symbol length of the PUSCH transmission from the starting symbol S. Alternatively, the starting symbol S and the allocation length L may be indicated jointly as Start and Length Indicator Value (SLIV). The Frequency Domain Resource Allocation (FDRA) in this configuration is likely to be the same or shared for all PDSCH/PUSCH. Similarly modulation and coding schemes, MCS, are likely to be the same or shared for all PDSCH/PUSCH.

In sub-band full-duplex (SBFD) communications, which may also be referred to as "sub-band frequency division duplex (SBFDD)" or "flexible duplex." a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by one or more guard bands. Providing DCI enhancements to support multi-PDSCH/PUSCH scheduling in a SBFD communication system provide a number of challenges, predominantly due to the increase overhead due to the potentially large DCI size which results from the provision of support for multi-PDSCH/PUSCH scheduling in a DBFD communication system.

Particular aspects of the subject matter described in this disclosure can be implemented to realize one or more of the following potential advantages. Procedures are enhanced to allow for different FDRA across SBFD and non-SBFD symbols, as well as supporting different MCS such that enhanced uplink coverage, reduced latency, improved system capacity and improved configuration flexibility for NR TDD operations in an unpaired spectrum is provided. By considering single DCI scheduling of multiple PDSCH/PUSCH in Sub-Band Full Duplex, SBFD deployment system, capacity and flexibility improvements are facilitated in accordance with embodiments as described in the following paragraphs.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a mid-haul link, such as a DU. In some examples, a network node 110 is or includes a network node that communicates with other network nodes 110 via a mid-haul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, mid-haul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

The terms "base station" or "network node" may refer to an aggregated base station, a disaggregated base station, an integrated access and backhaul (IAB) node, a relay node, or one or more components thereof. For example, "base station" or "network node" may refer to a CU, a DU, an RU, a Near-Real Time (Near-RT) RAN Intelligent Controller (RIC), or a Non-Real Time (Non-RT) RIC, or a combination thereof. The terms "base station" or "network node" may refer to one device configured to perform one or more functions, such as those described herein in connection with the network node 110. The terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. The terms "base station" or "network node" may refer to one or more virtual base stations or one or more virtual base station functions. For example, two or more base station functions may be instantiated on a single device. The terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. The network controller 130 may be a CU or a core network device or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it will be appreciated that the term "sub-6 GHz" or the like, if used herein, may broadly represent frequencies that may be less than 6 GHz, may be within FR1, or may include mid-band frequencies. Further, unless specifically stated otherwise, it will be appreciated that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In a configuration, the UE 120 may include a communication manager 140. As described in more detail elsewhere herein, the communication manager 140 may receive a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots Additionally, or alternatively, the communication manager 140 may perform one or more other operations described herein.

In a configuration, the UE 120 may include a communication manager 140. As described in more detail elsewhere herein, the communication manager 140 may receive receiving a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full .duplex, SBFD, slot of the plurality of slots and a second MCS for an uplink slot of the plurality of slots. Additionally, or alternatively, the communication manager 140 may perform one or more other operations described herein.

In a configuration, the base station 110 may include a communication manager 150. As described in more detail elsewhere herein, the communication manager 150 may transmit transmitting a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots. Additionally, or alternatively, the communication manager 150 may perform one or more other operations described herein.

In a configuration, the base station 110 may include a communication manager 150. As described in more detail elsewhere herein, the communication manager 150 may transmit a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots. Additionally, or alternatively, the communication manager 150 may perform one or more other operations described herein.

As indicated above, FIG. 1 is provided as an example. Other examples may differ from that which is described in FIG. 1.

Figure 2:
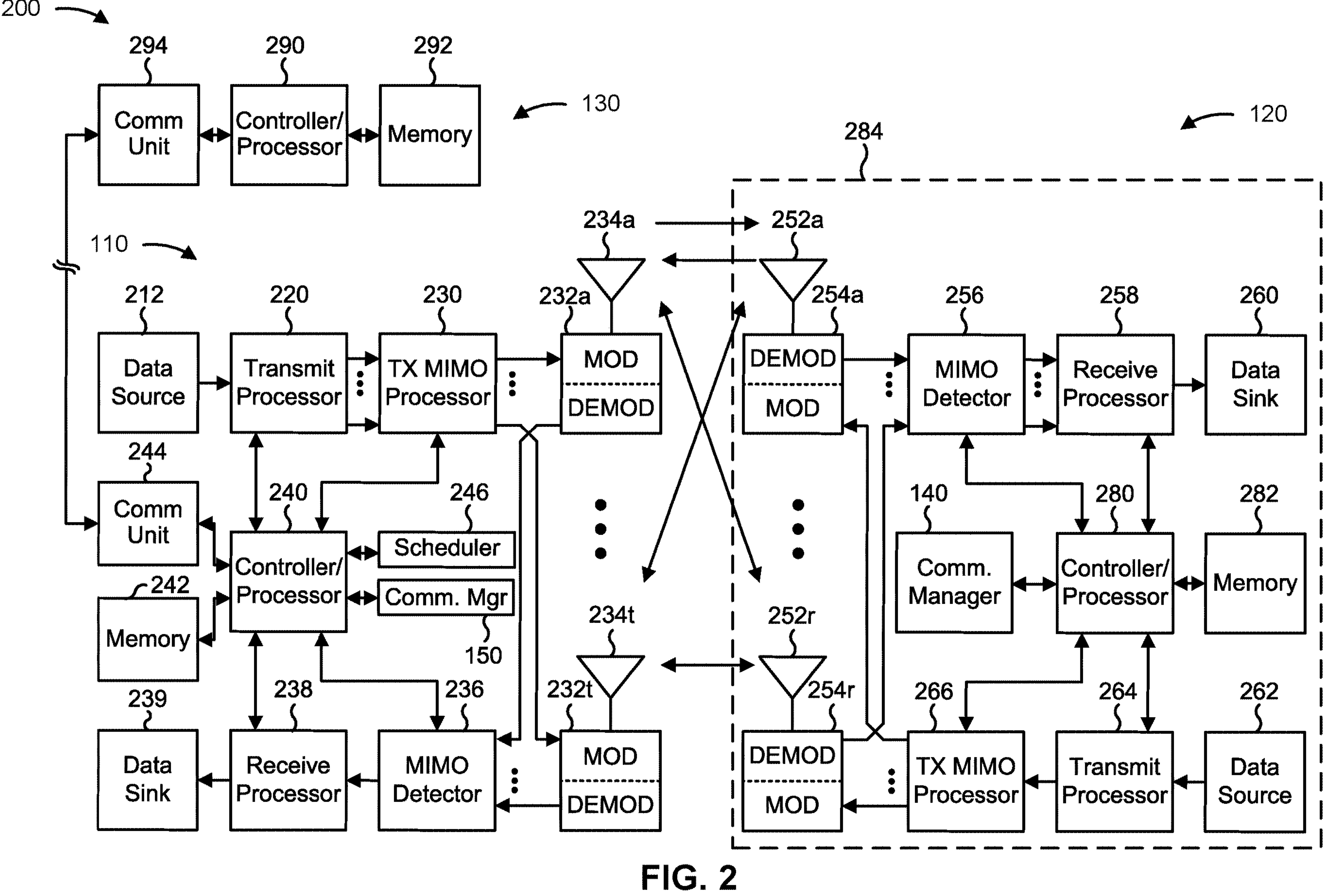
FIG. 2 illustrates a user equipment, UE and a base station in mutual communication, in accordance with an aspect of the present disclosure.

FIG. 2 is a diagram illustrating an example 200 of a base station or network node 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1). The base station 110 of example 200 includes one or more radio frequency components, such as antennas 234 and a modem 254. In some examples, a base station or network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the base station or network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station or network node 110 and/or other base stations or network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM) and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the network node or base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node or base station 110 may include a communication unit 244 and may communicate with the network controller 130 via the communication unit 244. The network node or base station 110 may include a scheduler 246 to schedule one or more UEs 120 for downlink and/or uplink communications. In some examples, the modem 232 of the network node or base station 110 may include a modulator and a demodulator. In some examples, the network node or base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the network node or base station 110, the controller/processor 280 of the UE 120, and/or any other component(s) of FIG. 2 may perform one or more techniques associated with resource allocation scaling for SBFD communications, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, process 1200 of FIG. 12, and process 1300 of FIG. 13 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, process 1200 of FIG. 12, and process 1300 of FIG. 13 and/or other processes as described herein and/or other processes as described herein. In some examples, executing instructions may include running the instructions, converting the instructions, compiling the instructions, and/or interpreting the instructions, among other examples.

In one configuration, the UE 120 includes means for receiving a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and means for communicating, with a base station, in accordance with the received indication.

In one configuration, the UE 120 includes means for receiving a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and means for communicating, with a base station, in accordance with the received indication.

The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and means for communicating, with a user equipment, in accordance with the transmitted indication.

In some aspects, the base station 110 comprises means for transmitting a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and means for communicating, with a user equipment, in accordance with the transmitted indication.

The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an JAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
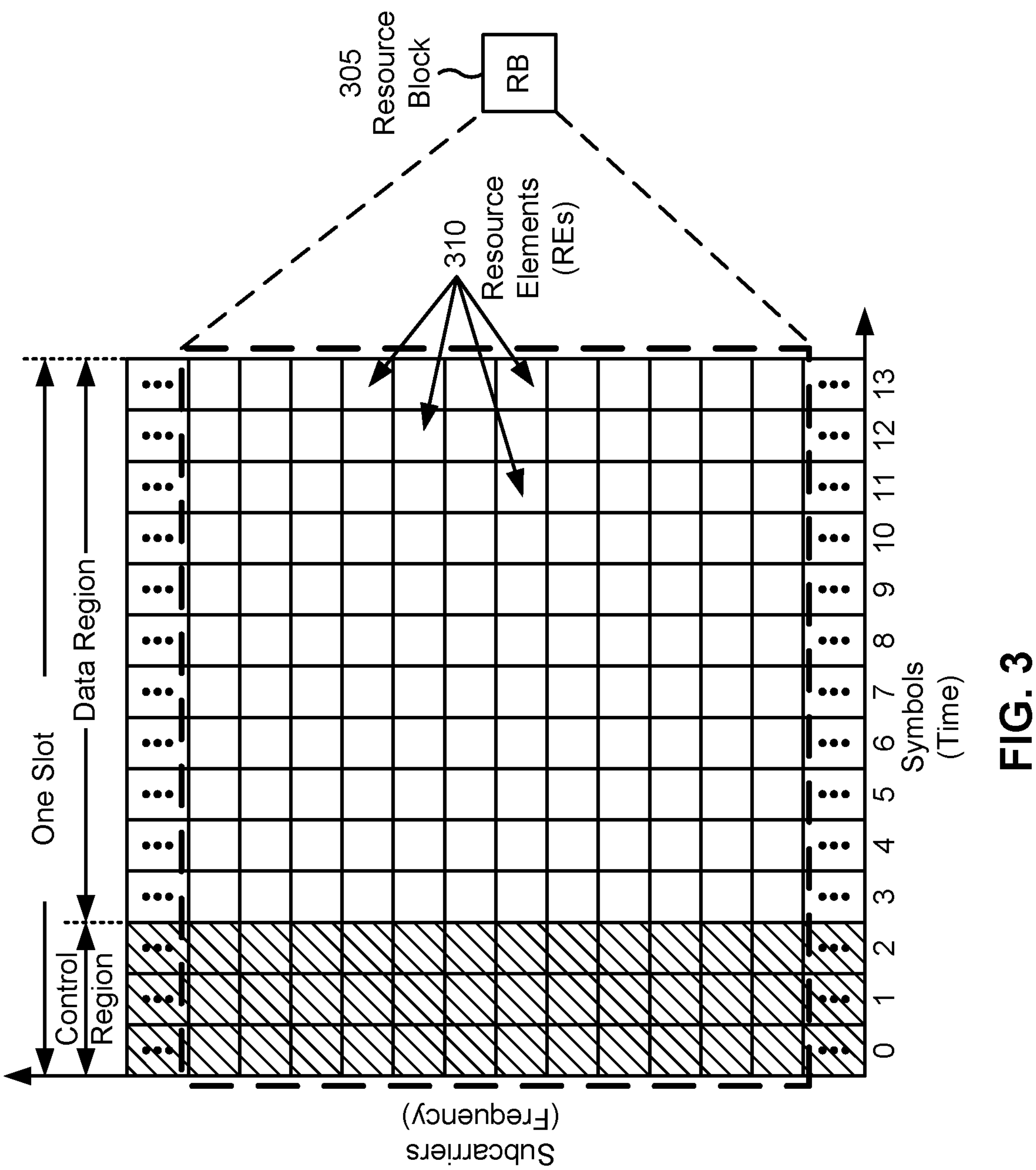
FIG. 3 is slot format in accordance with an embodiment of the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 405. An RB 305 is sometimes referred to as a physical resource block (PRB). An RB 305 includes a set of subcarriers (e.g., 12 subcarriers) and a set of symbols (e.g., 14 symbols) that are schedulable by a network node 110 as a unit. An RB 305 may include a set of subcarriers in a single slot. As shown, a single time-frequency resource included in an RB 405 may be referred to as a resource element (RE) 410. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value. RBs may be bundled together to form resource block groups (RBGs). For example, and as described further herein, an RBG may include multiple RBs, such as 2, 4, 8, or 16 RBs, which are allocated for wireless communication.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. The link direction for a slot may be dynamically configured.

As indicated above, FIG. 3 is provided as an example. Other examples may differ from what is described with respect to FIG. 3.

Figure 4:
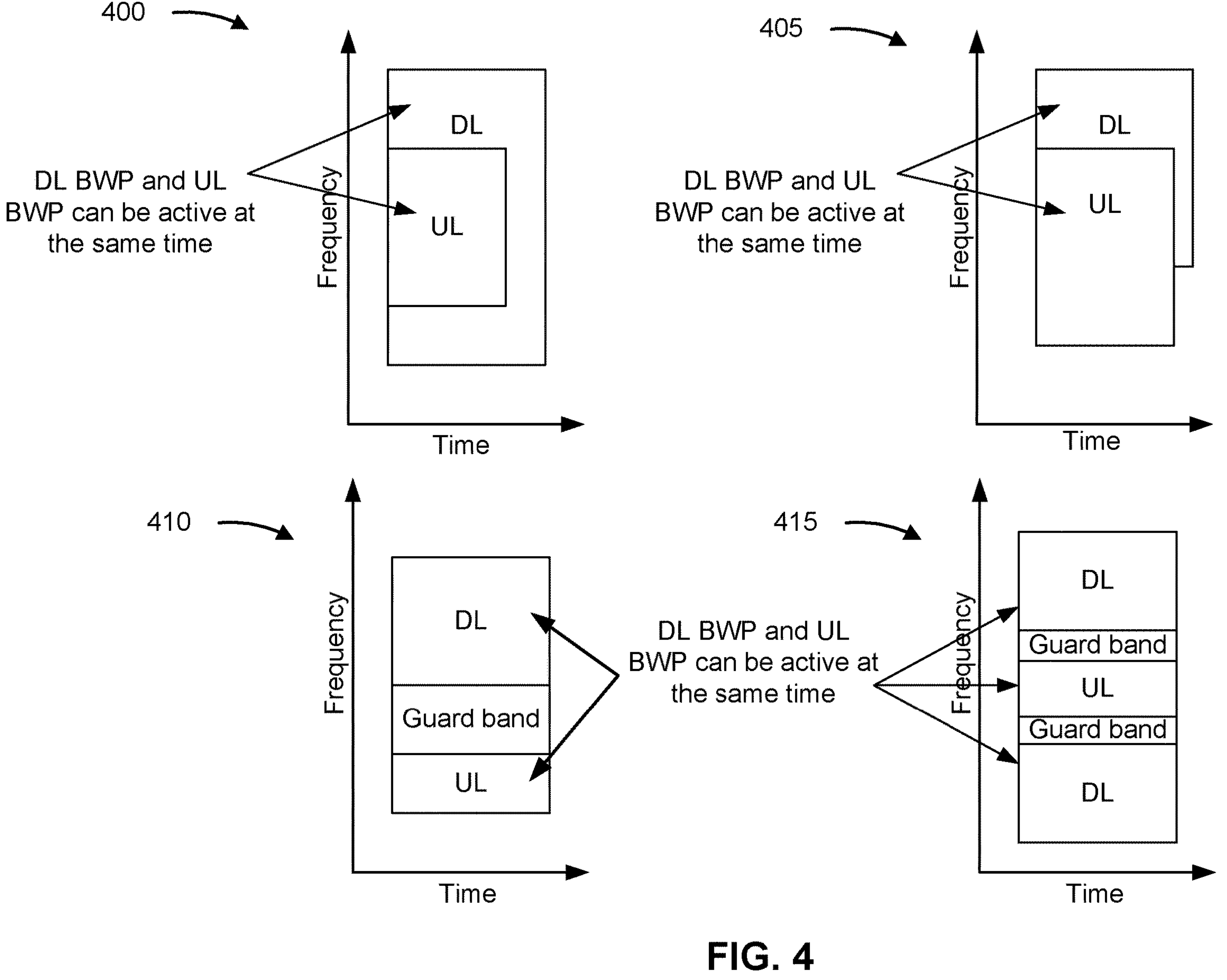
FIG. 4 is a diagram illustrating examples of full-duplex communication in a wireless network, in accordance with the present disclosure.

FIG. 4 is a diagram illustrating examples 400, 405, 410, and 415 of full-duplex communication in a wireless network, in accordance with the present disclosure. "Full-duplex communication" in a wireless network refers to simultaneous bi-directional communication between devices in the wireless network. For example, a UE or network node operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication)

between devices at a given time (e.g., in a given slot or a given symbol). Half-duplex communication may be performed, for example, using frequency division duplexing (FDD) and/or time-division duplexing (TDD). In FDD mode, for example, a UE may use a first frequency region (or channel) for uplink communication and a second frequency region (or channel) for downlink communication at the same time (e.g., in a same frame, slot, and/or symbol). In TDD mode, a UE may transmit uplink communications and receive downlink communications in a single frequency region, but at different time intervals (e.g., frames, slots, and/or symbols).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, examples 410 and 415 show examples of sub-band full-duplex (SBFD) communications, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by one or more guard bands.

As indicated above, FIG. 4 is provided as an example. Other examples may differ from what is described with respect to FIG. 4.

NR and LTE use downlink control information, DCI, to send physical layer control messages from the network to each UE. This information can be system wide or user equipment specific and contains aspects of uplink and downlink data scheduling, hybrid automatic repeat request (HARQ) information for the uplink and downlink, power control commands and other signaling. NR defines a number of different DCI formats, each serving a different usage. For example, DCI Format 0_0 and DCI Format 0_1 are used for the scheduling of PUSCH in one cell. Similarly, DCI Format 1_0 and DCI 1_1 are used for the scheduling of PDSCH. Similarly, DCI 1_2 is a compact DCI format. While discussed herein in relation to DCI 1_1 it will be appreciated that the methods described herein may equally be applicable to DCI 1_0 and DCI 1_2 (Compact DCI for PDSCH). DCI enhancements to support multi-PDSCH/PUSCH scheduling have been previously proposed with the use of a single DCI to schedule both PDSCH and PUSCH. Previously, a modified Time Domain Resource Assignment Table (TDRA) table has been proposed where the TDRA table is extended such that each row indicates up to 8 multiple PDSCH/PUSCH. Each PDSCH/PUSCH is provided with a separate Start and Length Indicator (SLIV) for the time domain allocation for PDSCH/PUSCH. Furthermore, the extended TDRA table provides scheduling offset K0 (or K2) for each PDSCH/PUSCH in the corresponding row of the TDRA table. Each PDSCH/PUSCH shares the same Frequency Domain Resource Allocation (FDRA) and Modulation Coding Scheme (MCS). However, it will be appreciated that this incurs significant overhead through the large DCI size required to implement a single DCI to schedule both PDSCH and PUSCH.

To reduce overhead the TDRA table may be simplified by facilitating collisions with time domain uplink/downlink symbols. This simplifies the TDRA table by allowing some but not all of SLIVs in a grant to collide with semi-static uplink/downlink grants.

Figure 5:
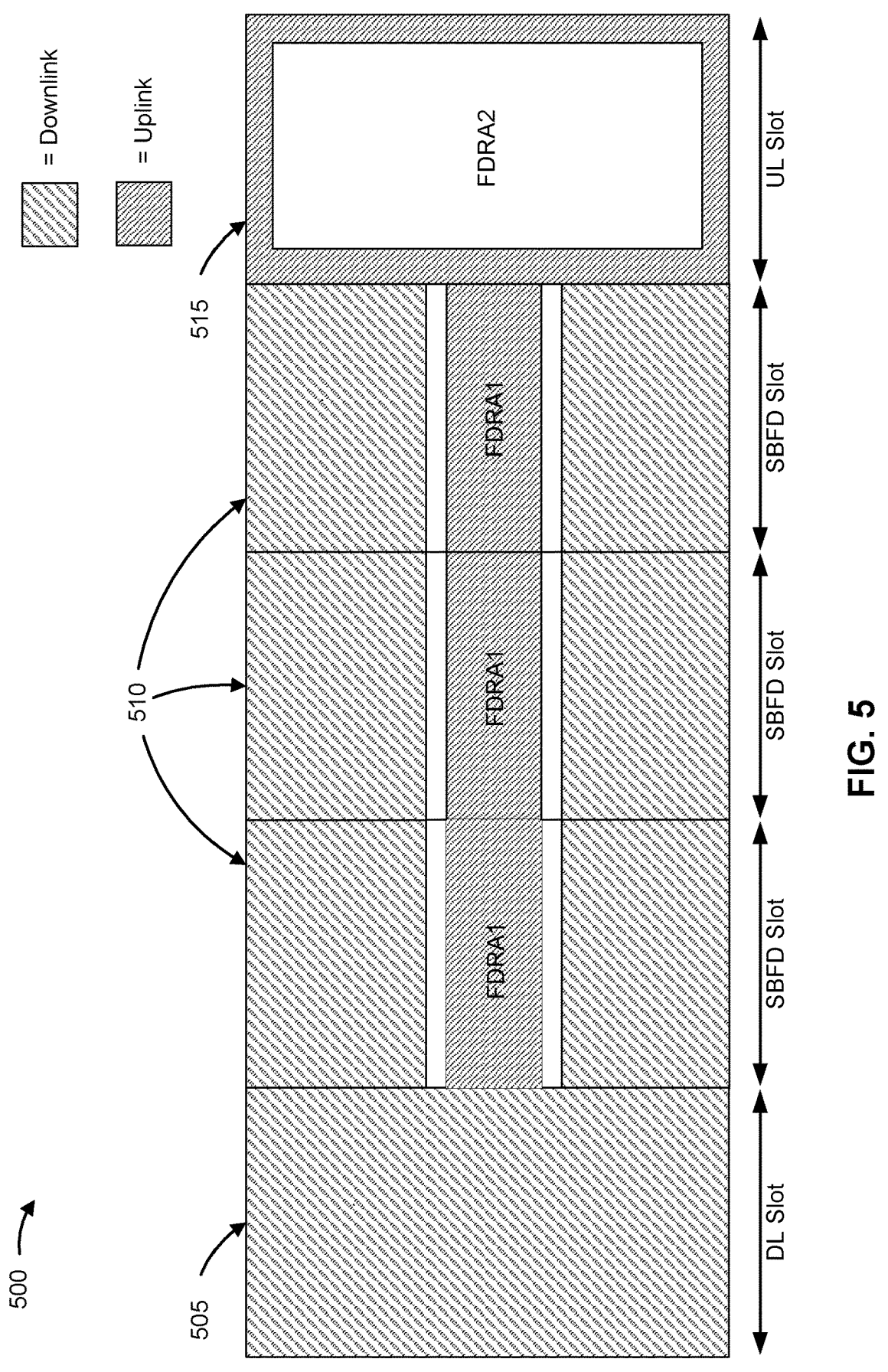

FIG. 5 shows an example frequency domain resource allocation (FDRA) in accordance with the present application. As shown in FIG. 5, there are three slot types, a downlink slot, 505, an uplink slot 515 and an SBFD slot 510. As shown in FIG. 5, in the embodiment shown herein there are provided three SBFD slots 510, however, it will be appreciated that this is an example only and not restricted as such. In accordance with the present application, an FDRA can be indicated via a control resource set DCI. In an alternative embodiment, an FDRA may be indicated via higher layer configurations, e.g., RRC. As shown in FIG. 5, a single downlink control message DCI is received comprising an indication of a plurality of FDRAs for a plurality of slots including a first FDRA for a SBFD slot 510 and a second different FDRA for an uplink slot 515. In a first configuration as shown a DCI carries two different FDRAs. Depending on the slot format one FDRA is chosen. A specific order may be applied to the FDRAs wherein a first FDRA is applied to time division duplex, TDD slots and a second FDRA is applied to SBFD slots. It will equally be appreciated that the first FDRA may be applied to SBFD slots and the second FDRA applied to TDD.

In a second configuration, wherein the DCI message includes a plurality of FDRAs, a one to one mapping is provided to each of the plurality of transport blocks, TBs. In a third configuration, the DCI message includes a FDRA bitfield. The FDRA bitfield included in the DCI message maps to a table of FDRA entries. Each entry has a list of corresponding FDRAs that in turn provide one to one mappings to each of the plurality of transport blocks. It will be appreciated that the three configurations provided herewith reduce the overhead in the DCI message. Accordingly, a single DCI is provided which schedules multiple transmissions across transport blocks, thus improving resource usage. Single DCI scheduling of multiple PDSCH/PUSCH in SBFD deployment allows for improved system capacity and flexibility improvements in a wireless communication system.

Additionally or alternatively system capacity can also be improved by single DCI scheduling multiple PUSCHs through the use of multiple or different modulation and coding schemes, MCSs across transport blocks. In a configuration, a DCI message carries multiple MCS fields. It will be appreciated however, that this may result in an increase in DCI overhead. In a first configuration, the DCI message may carry two MCSs. Depending, on the slot format an appropriate MCS is chosen. Accordingly, it will be appreciated, that where the slot is a SBFD slot a first MCS may be chosen. If the slot is an uplink slot a second MCS is chosen. It will be appreciated that this reduces the overhead associated with the DCI message. While described as a first MCS is allocated to SBFD and a second MCS is allocated to the uplink channel, it will be appreciated that any order may be applied to the allocation. In one configuration, a specific order may be considered such that the first MCS is always applicable to the uplink slot and the second MCS is always applicable to the SBFD slot or vice versa. In an additional configuration, multiple MCSs may be provided in the DCI message with a one to one mapping to the plurality of transport blocks. It will be appreciated that the use of multiple modulation and coding schemes is helpful where UE power is already at a maximum level.

To further reduce the overhead associated with the indication of multiple modulation and coding schemes and where multiple schemes are provided, a second or subsequent MCS may be conveyed with reference to a first MCS. For example, where two MCS need to be signaled, the following may apply:

$$(MCS1,MCS2)\rightarrow(MCS1,deltaMCS) \text{ where } deltaMCS=MCS1-MCS2 \quad (1)$$

As outlined above, to reduce overhead the TDRA table may be simplified by facilitating collisions with time domain uplink/downlink symbols. This simplifies the TDRA table by allowing some but not all of SLIVs in a grant to collide with semi-static uplink/downlink grants. For example, and as described herein the available frequency resources are determined. For example, if a first slot of the plurality of slots is an SBFD slot and the first FDRA is for a sub-band associated with the first slot, communicating with the base station or network entity may comprise dropping a transmission of the plurality of transmissions associated with the first slot where a SBFD slot, does not have enough frequency resources in the sub-band for a particular FDRA. In this example, the PDSCH/PUSCH may be dropped as there are insufficient frequency resources available. In an alternative configuration, a new FDRA may be determined or selected based on the first FDRA for which there are insufficient resources. A new FDRA may be determined based on the first FDRA and an overlap of the first FDRA with available resources in the sub-band.

In a further configuration, collisions in time may also be accommodated for both PUSCH and PDSCH. For example, in one configuration wherein a first slot of the plurality of slots is an SBFD slot and the first slot is associated with a first sub-band and a second sub-band with the first FDRA being allocated for the first sub-band and wherein the second sub-band of the slot is configured with a Random Access Channel, RACH, occasion, RO it will be appreciated that the downlink FDRA does not collide with the RO frequency resources. In this configuration, collision in time is allowed as the PDSCH transmission is not dropped, thus allowing for collision in time. In a second configuration in a SBFD slot that is configured with a synchronization signal block, SSB, if the uplink FDRA does not collide with the SSB frequency resources, then the PUSCH transmission is maintained, i.e. is not dropped. In this configuration a first slot of the plurality of slots is an SBFD slot, the first slot comprises a first sub-band and a second sub-band, the second sub-band being configured with a synchronization signal block, and wherein communicating, with the network entity, in accordance with the received indication comprises transmitting/maintaining a physical uplink shared channel, PUSCH, transmission. This further facilitates a collision in time and optimization of resources associated with a single DCI scheduling multiple PUSCH/PDSCH.

In a further configuration, where a single DCI schedules multiple PUSCHs in accordance with the present disclosure repetitions may be enabled.

Figure 6:
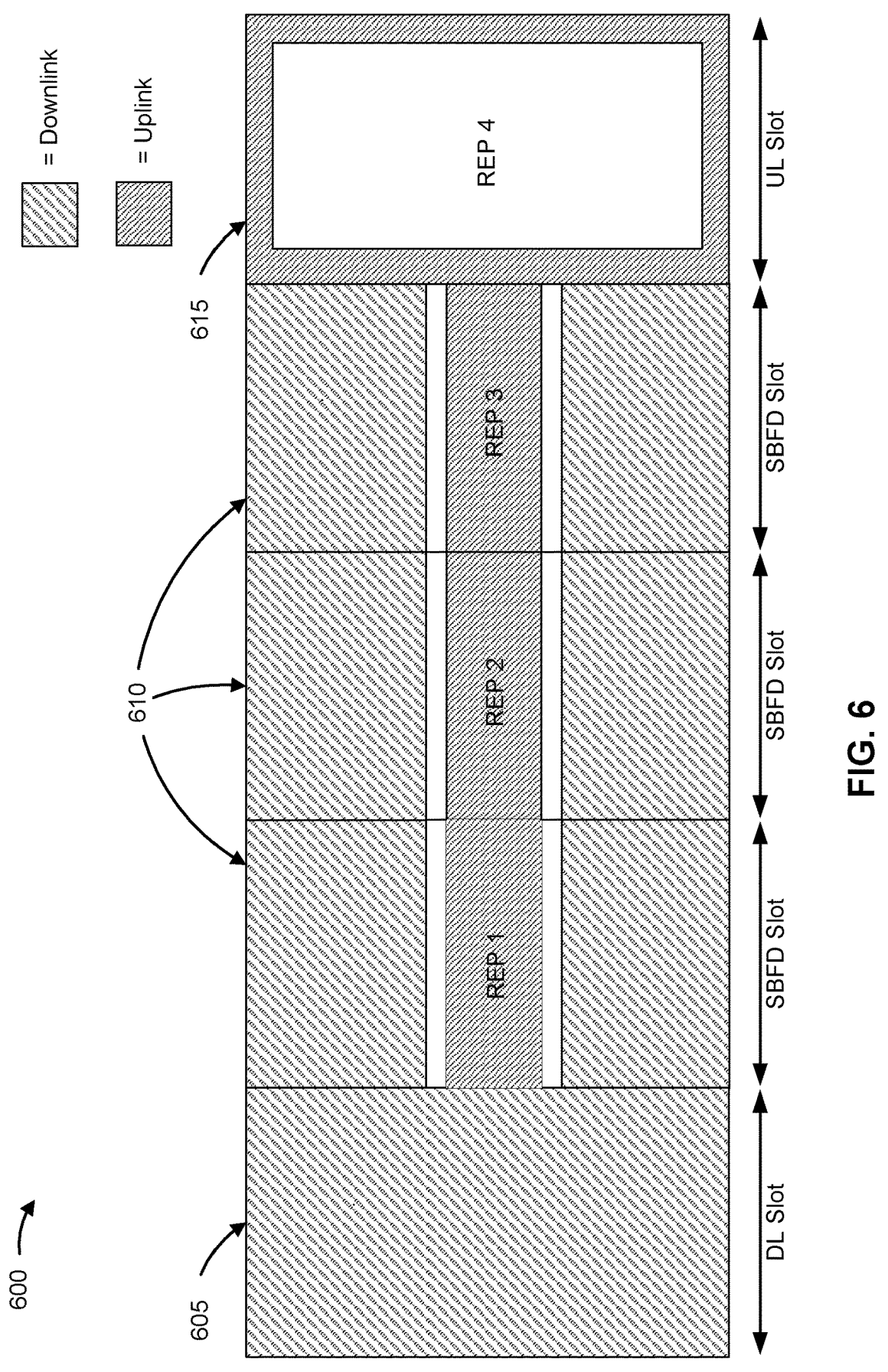

FIG. 6 shows an example frequency domain resource allocation (FDRA) in accordance with the present application. As shown in FIG. 6, there are three slot types, a downlink slot, 605, an uplink slot 615 and an SBFD slot 610. As shown in FIG. 6, in the embodiment shown herein there are provided three SBFD slots 510, however, it will be appreciated that this is an example only and not restricted as such. A UE configured for PUSCH repetition decodes the DCI message which will appreciably include a scheduling grant for a PUSCH transmissions. As shown in FIG. 6 repetitions are allowed in SBFD slots and uplink slot only. In accordance with an embodiment of the present disclosure, a DCI message could indicate more than 1 repetition for each TB. It will be appreciated that this information may be incorporated in a Time Domain Resource Allocation table. In a first configuration, and for each repetition of a transport block, TB, an first FDRA or a second FDRA is chosen depending on whether a slot is an uplink slot or a SBFD slot as described above. In an exemplary embodiment, where PUSCH repetitions are configured via a single DCI scheduling multiple PUSCH, it will be appreciated that the RV index associated with each repetition needs to be clarified. In a configuration, legacy RV cycling schemes can be repurposed. A number of bits are selected for rate matching based on the FDRA selected for the corresponding repetition.

Figure 7:
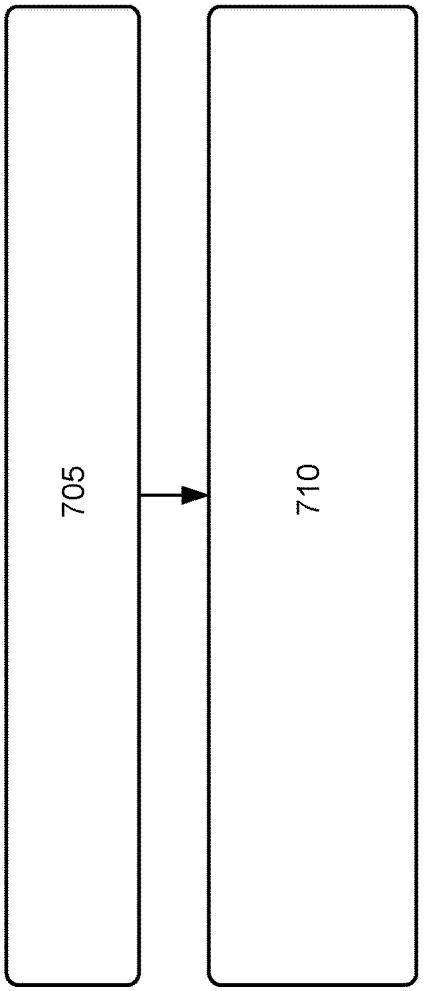
FIG. 7 is a block diagram of a process implemented at a UE in accordance with an embodiment of the present disclosure.

FIG. 7 is a diagram illustrating an example process 1000 performed, for example, by a UE, in accordance with the present disclosure.

As further shown in FIG. 7, in some aspects, process 700 may include a first step 705 which comprises receiving a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots. The process 700 further comprises a second step 710 comprising communicating, with a base station, in accordance with the received indication In a first aspect, each of the plurality of transmissions is a physical uplink shared channel, PUSCH, transmission or a physical downlink shared channel, PDSCH, transmission.

In a second aspect, the indication comprises a FDRA bitfield and wherein a value of the bitfield maps to an associated FDRA pattern in a FDRA table of FDRA patterns.

In a third aspect, wherein the indication comprises two FDRA bitfields, wherein a first FDRA bitfield of the two FDRA bitfields comprises an indication of the first FDRA for the SBFD slot, and a second FDRA bitfield of the two FDRA bitfields comprises an indication of the second FDRA for the uplink slot.

In a fourth aspect, a first slot of the plurality of slots is an SBFD slot and the first FDRA is for a sub-band associated with the first slot, and further determining available frequency resources in the sub-band.

In a fifth aspect, communicating with the network entity in accordance with the received indication comprises dropping a transmission of the plurality of transmissions associated with the first slot based on a determination that the available frequency resources in the sub-band associated with the first slot are insufficient for the transmission.

In a sixth aspect, communicating, with the network entity, in accordance with the received indication, comprises determining a new FDRA based on the first FDRA and an overlap of the first FDRA with available frequency resources in the sub-band.

In a seventh aspect, a first slot of the plurality of slots is an SBFD slot and the first slot is associated with a first sub-band and a second sub-band, the first FDRA being allocated for the first sub-band, wherein the second sub-band of the slot is configured with a Random Access Channel, RACH, occasion, RO, and wherein communicating, with the network entity, in accordance with the received indication, comprises transmitting a physical downlink shared channel, PDSCH, transmission in the first sub band.

In an eighth aspect, a first slot of the plurality of slots is an SBFD slot, the first slot comprises a first sub-band and a second sub-band, the second sub-band being configured with a synchronization signal block, and wherein communicating, with the network entity, in accordance with the received indication comprises transmitting a physical uplink shared channel, PDSCH, transmission.

It will be appreciated that any of the first through eight aspects may be implemented alone or in combination with any of the other aspects described herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
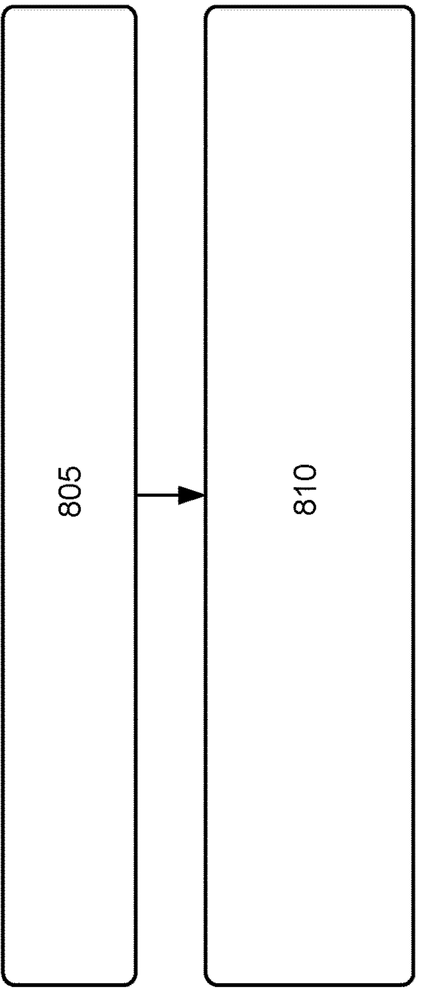
FIG. 8 is a block diagram of a process implemented at a UE in accordance with an embodiment of the present disclosure.

FIG. 8 is a diagram illustrating an example process 800 performed, for example, a user equipment, in accordance with the present disclosure.

As shown in FIG. 8, in some aspects, process 800 may include in a first step 805 at a user equipment, UE, receiving a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots. The process 800 may further comprise one or more second steps 810 comprising communicating, with a base station, in accordance with the received indication.

Process 800 may include additional aspects, such as any single aspect or any combination of aspects described below and/or in connection with one or more other processes described elsewhere herein.

In a first aspect, each of the plurality of transmissions is a physical uplink shared channel, PUSCH, transmission or a physical downlink shared channel, PDSCH, transmission.

In a second aspect, the indication comprises a first MCS and a delta value for a second MCS, the delta value being associated with a difference between the first MCS and the second MCS.

In a third aspect, the indication comprises a plurality of MCS bitfields, and wherein each of the plurality of MCS bitfields maps to a respective TB of the plurality of TBs.

In a fourth aspect, the indication comprises two MCS bitfields, and wherein a first MCS bitfield of the two MCS bitfields comprises an indication of the first FDRA for the SBFD slot and a second MCS bitfield of the two MCS bitfields comprises an indication of the second FDRA for the uplink slot of the plurality of slots.

It will be appreciated that any of the first through eight aspects may be implemented alone or in combination with any of the other aspects described herein.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
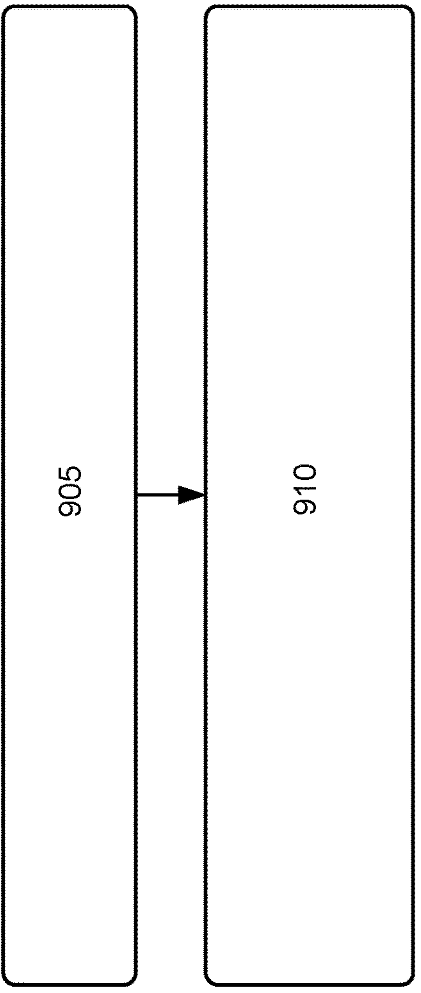
FIG. 9 is a block diagram of a process implemented at a base station in accordance with the present disclosure

As shown in FIG. 9, process 900 may include processes implemented for example, at a base station, including in a first step 905, transmitting a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots. The process 900 may further comprise a second or subsequent steps 910 comprising communicating, with a user equipment, in accordance with the transmitted indication.

Figure 10:
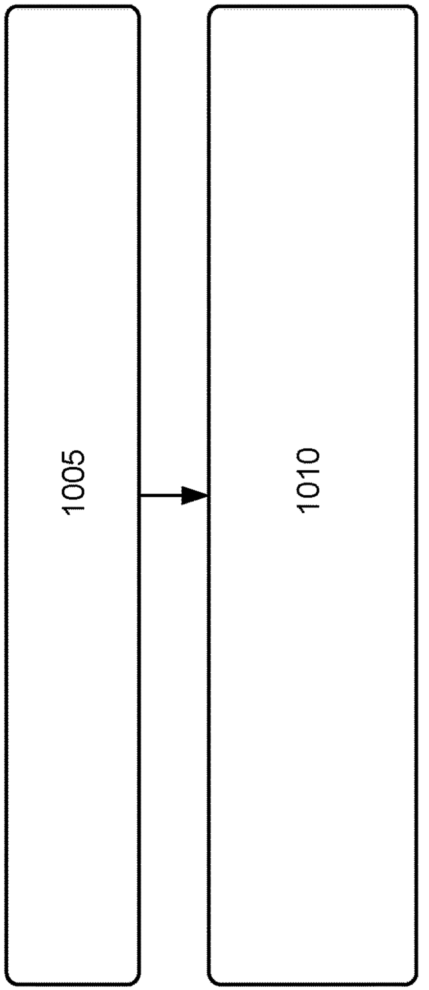
FIG. 10 is a diagram illustrating an example process at a base station in accordance with an embodiment of the present disclosure.

As shown in FIG. 10, process 1000 may include processes implemented for example, at a base station, including in a first step 1005, transmitting a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots. Process 1000 may further comprise one or more steps 1010 comprising communicating, with a user equipment, in accordance with the transmitted indication.

Figure 11:
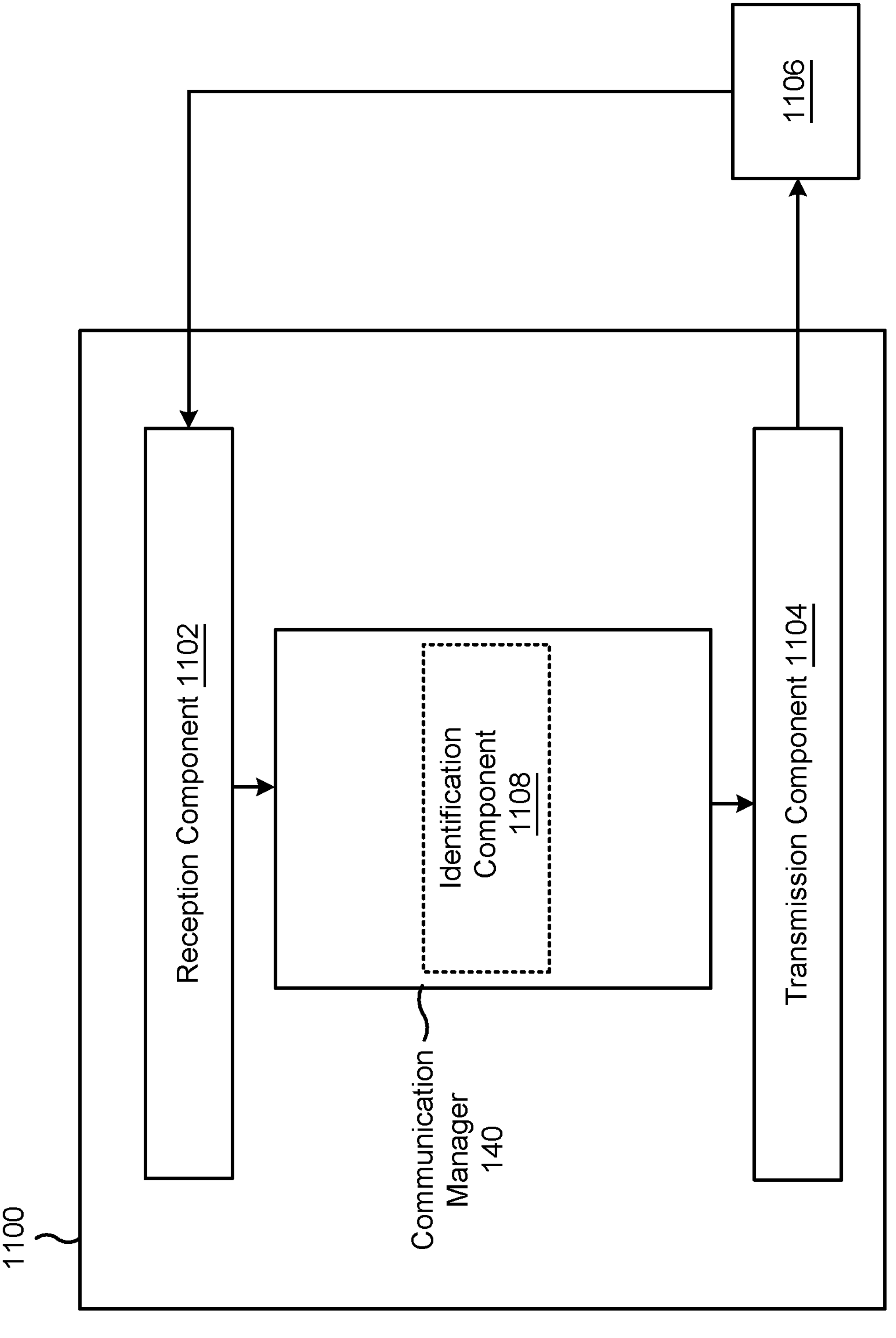
FIG. 11 is an example apparatus for wireless communication in accordance with the present disclosure.

As shown in FIG. 11, an example apparatus 1100 in accordance with the present disclosure is described. The apparatus may be a UE or may include a UE. Alternatively, the apparatus may include a UE. The apparatus 1100 may include means for means for receiving a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and means for communicating, with a base station, in accordance with the received indication. The apparatus 1100 may alternatively or additionally include means for receiving a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and means for communicating, with a base station, in accordance with the received indication. the apparatus 1100 includes a reception component 1102 and a transmission component 1104, which may be in communication with one another (for example, via one or more buses and/or one or more other components).

As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include an identification component 1108, among other examples. The apparatus according to FIG. 11 may be configured to implement the processes described herein in relation to FIG. 7 or FIG. 8.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In a configuration, one or more other components of the apparatus 1100 may generate communications and may provide the generated communications to the transmission component 1104 for transmission to the apparatus 1106. In a configuration, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some arrangements, the transmission component 1104 may include one or more antennas, a modem, a modulator, a transmit MIMO processor, a transmit processor, a controller/processor, a memory, or a combination thereof, of the UE described in connection with FIG. 2. In some arrangements, the transmission component 1104 may be co-located with the reception component 1102 in a transceiver.

Figure 12:
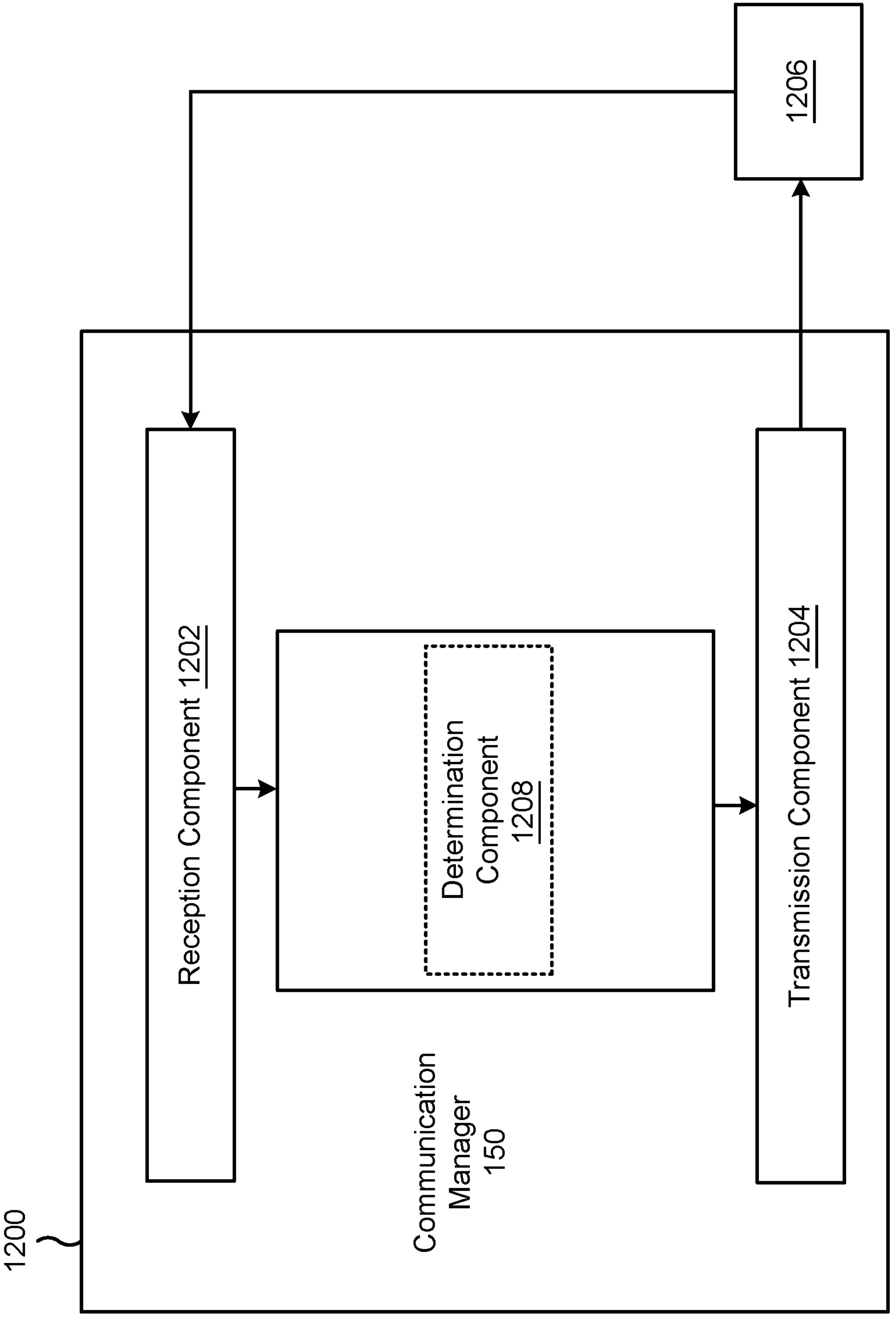
FIG. 12 is an example apparatus for wireless communication in accordance with the present disclosure.

As shown in FIG. 12, an example apparatus 1200 in accordance with the present disclosure is described. The apparatus 1200 may be a base station or a network entity or a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more other components, such as a determination component 1208, among other examples.

In some aspects, the apparatus 1200 may be configured to perform one or more operations described herein in connection with FIG. 9 and FIG. 10. Additionally, or alternatively, the apparatus 1200 may be configured to perform one or more processes described herein. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1. A method for wireless communication performed by a user equipment, UE, comprising: receiving a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and communicating, with a base station, the plurality of TBs over the plurality of slots including at least one of the SBFD slot or the uplink slot, in accordance with the received indication Aspect 2: The method of aspect 1, wherein each of the plurality of transmissions is a physical uplink shared channel, PUSCH, transmission or a physical downlink shared channel, PDSCH, transmission.

Aspect 3: The method of aspect 1, wherein the indication comprises a FDRA bitfield and wherein a value of the bitfield maps to an associated FDRA pattern in a FDRA table of FDRA patterns.

Aspect 4: The method of aspect 1, wherein the indication comprises two FDRA bitfields, wherein a first FDRA bitfield of the two FDRA bitfields comprises an indication of the first FDRA for the SBFD slot, and a second FDRA bitfield of the two FDRA bitfields comprises an indication of the second FDRA for the uplink slot.

Aspect 5: The method of aspect 2 wherein a first slot of the plurality of slots is an SBFD slot and the first FDRA is for a sub-band associated with the first slot, and wherein the method comprises determining available frequency resources in the sub-band.

Aspect 6: The method of aspect 5, wherein communicating with the network entity in accordance with the received indication comprises dropping a transmission of the plurality of transmissions associated with the first slot based on a determination that the available frequency resources in the sub-band associated with the first slot are insufficient for the transmission.

Aspect 7: The method of abstract 5, wherein communicating, with the network entity, in accordance with the received indication, comprises determining a new FDRA based on the first FDRA and an overlap of the first FDRA with available frequency resources in the sub-band.

Aspect 8: The method of abstract 1, wherein a first slot of the plurality of slots is an SBFD slot and the first slot is associated with a first sub-band and a second sub-band, the first FDRA being allocated for the first sub-band, wherein the second sub-band of the slot is configured with a Random Access Channel, RACH, occasion, RO, and wherein communicating, with the network entity, in accordance with the received indication, comprises transmitting a physical downlink shared channel, PDSCH, transmission in the first sub band.

Aspect 9: The method of aspect 1, wherein, a first slot of the plurality of slots is an SBFD slot, the first slot comprises a first sub-band and a second sub-band, the second sub-band being configured with a synchronization signal block, and wherein communicating, with the network entity, in accordance with the received indication comprises transmitting a physical uplink shared channel, PDSCH, transmission.

Aspect 10: A method for wireless communication performed by a user equipment, UE, comprising: receiving a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and communicating, with a base station, the plurality of TBs over the plurality of slots including at least one of the SBFD slot or the uplink slot, in accordance with the received indication Aspect 11: The method of aspect 11 wherein each of the plurality of transmissions is a physical uplink shared channel, PUSCH, transmission or a physical downlink shared channel, PDSCH, transmission.

Aspect 12: The method of aspect 11, wherein the indication comprises a first MCS and a delta value for a second MCS, the delta value being associated with a difference between the first MCS and the second MCS.

Aspect 13: The method of aspect 11, wherein the indication comprises a plurality of MCS bitfields, and wherein each of the plurality of MCS bitfields maps to a respective TB of the plurality of TBs.

Aspect 14: A user equipment for wireless communication, comprising: means for receiving a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and means for communicating, with a base station, the plurality of TBs over the plurality of slots including at least one of the SBFD slot or the uplink slot, in accordance with the received indication.

Aspect 15: The user equipment of aspect 14, wherein each of the plurality of transmissions is a physical uplink shared channel, PUSCH, transmission or a physical downlink shared channel, PDSCH, transmission.

Aspect 16: The user equipment of aspect 15, wherein the indication comprises a FDRA bitfield and wherein a value of the bitfield maps to an associated FDRA pattern in a FDRA table of FDRA patterns.

Aspect 17: The user equipment of aspect 14, wherein the indication comprises two FDRA bitfields, wherein a first FDRA bitfield of the two FDRA bitfields comprises an indication of the first FDRA for the SBFD slot, and a second FDRA bitfield of the two FDRA bitfields comprises an indication of the second FDRA for the uplink slot.

Aspect 18: The user equipment of aspect 14 wherein a first slot of the plurality of slots is an SBFD slot and the first FDRA is for a sub-band associated with the first slot, and wherein the method comprises determining available frequency resources in the sub-band.

Aspect 19: The user equipment of aspect 18, wherein communicating with the network entity in accordance with the received indication comprises dropping a transmission of the plurality of transmissions associated with the first slot based on a determination that the available frequency resources in the sub-band associated with the first slot are insufficient for the transmission; or wherein communicating, with the network entity, in accordance with the received indication, comprises determining a new FDRA based on the first FDRA and an overlap of the first FDRA with available frequency resources in the sub-band.

Aspect 20: The user equipment of aspect 14, wherein a first slot of the plurality of slots is an SBFD slot and the first slot is associated with a first sub-band and a second sub-band, the first FDRA being allocated for the first sub-band, wherein the second sub-band of the slot is configured with a Random Access Channel, RACH, occasion, RO, and wherein communicating, with the network entity, in accordance with the received indication, comprises transmitting a physical downlink shared channel, PDSCH, transmission in the first sub band.

Aspect 21: The user equipment of aspect 14, wherein, a first slot of the plurality of slots is an SBFD slot, the first slot comprises a first sub-band and a second sub-band, the second sub-band being configured with a synchronization signal block, and wherein communicating, with the network entity, in accordance with the received indication comprises transmitting a physical uplink shared channel, PDSCH, transmission.

Aspect 22: A user equipment for wireless communication, comprising: means for receiving a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and means for communicating, with a base station, the plurality of TBs over the plurality of slots including at least one of the SBFD slot or the uplink slot, in accordance with the received indication.

Aspect 23: The user equipment of aspect 22 wherein each of the plurality of transmissions is a physical uplink shared channel, PUSCH, transmission or a physical downlink shared channel, PDSCH, transmission.

Aspect 24: The user equipment of aspect 22, wherein the indication comprises a first MCS and a delta value for a second MCS, the delta value being associated with a difference between the first MCS and the second MCS.

Aspect 25: The user equipment of aspect 22, wherein the indication comprises a plurality of MCS bitfields, and wherein each of the plurality of MCS bitfields maps to a respective TB of the plurality of TBs.

Aspect 26: A method for wireless communication performed by a base station, comprising: transmitting a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and communicating, with a user equipment, over the plurality of slots including at least one of the SBFD slot or the uplink slot, in accordance with the transmitted indication.

Aspect 27: A method for wireless communication performed by a base station, comprising: transmitting a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and communicating, with a user equipment, over the plurality of slots including at least one of the SBFD slot or the uplink slot, in accordance with the transmitted indication.

Aspect 28: Abase station, comprising: means for transmitting a single downlink control information, DCI, message scheduling a plurality of transmissions for communicating a plurality of transport blocks, TBs, wherein the DCI message comprises an indication of a plurality of frequency domain resource allocations, FDRAs, for a plurality of slots including a first FDRA for a sub-band full duplex, SBFD, slot of the plurality of slots and a second FDRA for an uplink slot of the plurality of slots; and means for communicating, with a user equipment, over the plurality of slots including at least one of the SBFD slot or the uplink slot, in accordance with the transmitted indication.

Aspect 29: Abase station, comprising: means for transmitting a single downlink control information, DCI, message scheduling a plurality of transmissions for communicating a plurality of transport blocks, TBs, wherein the DCI message comprises an indication of multiple modulation and coding schemes, MCSs, for a plurality of slots wherein the indication indicates a first MCS for a sub-band full duplex, SBFD, slot of the plurality of slots and a second MCS for an uplink slot of the plurality of slots; and means for communicating, with a user equipment, over the plurality of slots including at least one of the SBFD slot or the uplink slot, in accordance with the transmitted indication.

The foregoing disclosure provides illustration and description but is not intended to be exhaustive or to limit the aspects to the precise forms disclosed. Modifications and variations may be made in light of the above disclosure or may be acquired from practice of the aspects.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A method for wireless communication performed by a user equipment, UE, comprising:

receiving a single downlink control information, DCI, message scheduling a plurality of transmissions for communicating a plurality of transport blocks, TBs, wherein the single DCI message comprises:

frequency domain resource allocation, FDRA, information for a plurality of slot types, the single DCI message comprising an indication of a plurality of FDRAs for a plurality of slots including a first FDRA for a sub-band full duplex, SBFD, slot of the plurality of slots and a second FDRA for an uplink slot of the plurality of slots, wherein the indication comprises a FDRA bitfield, wherein a value of the FDRA bitfield maps to an associated FDRA pattern in a FDRA table of FDRA patterns, or modulation and coding scheme, MCS, information for the plurality of slot types, the single DCI message comprising an indication of multiple MCSs for a plurality of slots wherein the indication indicates a first MCS for a sub-band full duplex, SBFD, slot of the plurality of slots and a second MCS for an uplink slot of the plurality of slots, wherein the indication comprises two MCS bitfields, wherein a first MCS bitfield of the two MCS bitfields comprises a first indication of the first MCS for the SBFD slot and a second MCS bitfield of the two MCS bitfields comprises a second indication of the second MCS for the uplink slot; and communicating the plurality of TBs via the plurality of slots including at least one of the SBFD slot or the uplink slot, in accordance with the indication of the plurality of FDRAs or the indication of multiple MCSs.

2. The method of claim 1, wherein each of the plurality of transmissions is a physical uplink shared channel, PUSCH, transmission or a physical downlink shared channel, PDSCH, transmission.

3. The method of claim 2, wherein a first slot of the plurality of slots associated with the plurality of FDRAs is an SBFD slot and the first FDRA is for a sub-band associated with the first slot, and wherein the method comprises determining available frequency resources in the sub-band.

4. The method of claim 3, wherein communicating the plurality of TBs in accordance with the indication of the plurality of FDRAs comprises dropping a transmission of the plurality of transmissions associated with the first slot based on a determination that the available frequency resources in the sub-band associated with the first slot are insufficient for the transmission.

5. The method of claim 3, wherein communicating the plurality of TBs in accordance with the indication of the plurality of FDRAs comprises determining a new FDRA based on the first FDRA and an overlap of the first FDRA with the available frequency resources in the sub-band.

6. The method of claim 1, wherein a first slot of the plurality of slots associated with the plurality of FDRAs is an SBFD slot and the first slot is associated with a first sub-band and a second sub-band, the first FDRA being allocated for the first sub-band, wherein the second sub-band of the slot is configured with a Random Access Channel, RACH, occasion, RO, and wherein communicating the plurality of TBs in accordance with the indication of the plurality of FDRAs comprises receiving a physical downlink shared channel, PDSCH, transmission in the first sub-band.

7. The method of claim 1, wherein, a first slot of the plurality of slots associated with the plurality of FDRAs is an SBFD slot, the first slot comprises a first sub-band and a second sub-band, the second sub-band being configured with a synchronization signal block, and wherein communicating the plurality of TBs in accordance with the indication of the plurality of FDRAs comprises transmitting a physical uplink shared channel, PUSCH, transmission.

8. The method of claim 1, wherein the indication of multiple MCSs comprises the first MCS and a delta value for the second MCS, the delta value being associated with a difference between the first MCS and the second MCS.

9. The method of claim 1, wherein the indication of multiple MCSs comprises a plurality of MCS bitfields, and wherein each of the plurality of MCS bitfields maps to a respective TB of the plurality of TBs.

10. A user equipment for wireless communication, comprising:

means for receiving a single downlink control information, DCI, message scheduling a plurality of transmissions for communicating a plurality of transport blocks, TBs, wherein the single DCI message comprises:

frequency domain resource allocation, FDRA, information for a plurality of slot types, the single DCI message comprising an indication of a plurality of FDRAs for a plurality of slots including a first FDRA for a sub-band full duplex, SBFD, slot of the plurality of slots and a second FDRA for an uplink slot of the plurality of slots, wherein the indication comprises:

a FDRA bitfield, wherein a value of the FDRA bitfield maps to an associated FDRA pattern in a FDRA table of FDRA patterns, or two FDRA bitfields, wherein a first FDRA bitfield of the two FDRA bitfields comprises a first indication of the first FDRA for the SBFD slot, and a second FDRA bitfield of the two FDRA bitfields comprises a second indication of the second FDRA for the uplink slot, or modulation and coding scheme, MCS, information for the plurality of slot types, the single DCI message comprising an indication of multiple MCSs for a plurality of slots wherein the indication indicates a first MCS for a sub-band full duplex, SBFD, slot of the plurality of slots and a second MCS for an uplink slot of the plurality of slots, wherein the indication comprises two MCS bitfields, wherein a first MCS bitfield of the two MCS bitfields comprises a first indication of the first MCS for the SBFD slot and a second MCS bitfield of the two MCS bitfields comprises a second indication of the second MCS for the uplink slot; and means for communicating the plurality of TBs via the plurality of slots including at least one of the SBFD slot or the uplink slot, in accordance with the indication of the plurality of FDRAs or the indication of multiple MCSs.

11. The user equipment of claim 10, wherein each of the plurality of transmissions is a physical uplink shared channel, PUSCH, transmission or a physical downlink shared channel, PDSCH, transmission.

12. The user equipment of claim 10, wherein a first slot of the plurality of slots associated with the plurality of FDRAs is the SBFD slot and the first FDRA is for a sub-band associated with the first slot, and wherein the user equipment comprises means for determining available frequency resources in the sub-band.

13. The user equipment of claim 12, wherein communicating the plurality of TBs in accordance with the indication of the plurality of FDRAs comprises dropping a transmission of the plurality of transmissions associated with the first slot based on a determination that the available frequency resources in the sub-band associated with the first slot are insufficient for the transmission; or wherein communicating the plurality of TBs in accordance with the indication of the plurality of FDRAs comprises determining a new FDRA based on the first FDRA and an overlap of the first FDRA with the available frequency resources in the sub-band.

14. The user equipment of claim 10, wherein a first slot of the plurality of slots associated with the plurality of FDRAs is an SBFD slot and the first slot is associated with a first sub-band and a second sub-band, the first FDRA being allocated for the first sub-band, wherein the second sub-band of the slot is configured with a Random Access Channel, RACH, occasion, RO, and wherein communicating the plurality of TBs in accordance with the indication comprises receiving a physical downlink shared channel, PDSCH, transmission in the first sub-band.

15. The user equipment of claim 10, wherein, a first slot of the plurality of slots associated with the plurality of FDRAs is an SBFD slot, the first slot comprises a first sub-band and a second sub-band, the second sub-band being configured with a synchronization signal block, and wherein communicating the plurality of TBs in accordance with the indication of the plurality of FDRAs comprises transmitting a physical uplink shared channel, PUSCH, transmission.

16. The user equipment of claim 10, wherein the indication of multiple MCSs comprises the first MCS and a delta value for the second MCS, the delta value being associated with a difference between the first MCS and the second MCS.

17. The user equipment of claim 10, wherein the indication of multiple MCSs comprises a plurality of MCS bitfields, and wherein each of the plurality of MCS bitfields maps to a respective TB of the plurality of TBs.

18. A method for wireless communication performed by a network entity, comprising:

transmitting a single downlink control information, DCI, message scheduling a plurality of transmissions for communicating a plurality of transport blocks, TBs, wherein the single DCI message comprises:

frequency domain resource allocation, FDRA, information for a plurality of slot types, the single DCI message comprising an indication of a plurality of FDRAs for a plurality of slots including a first FDRA for a sub-band full duplex, SBFD, slot of the plurality of slots and a second FDRA for an uplink slot of the plurality of slots, wherein the indication comprises a FDRA bitfield, wherein a value of the FDRA bitfield maps to an associated FDRA pattern in a FDRA table of FDRA patterns, or modulation and coding scheme, MCS, information for the plurality of slot types, the single DCI message comprising an indication of multiple MCSs for a plurality of slots wherein the indication indicates a first MCS for a sub-band full duplex, SBFD, slot of the plurality of slots and a second MCS for an uplink slot of the plurality of slots, wherein the indication comprises two MCS bitfields, wherein a first MCS bitfield of the two MCS bitfields comprises a first indication of the first MCS for the SBFD slot and a second MCS bitfield of the two MCS bitfields comprises a second indication of the second MCS for the uplink slot; and communicating via the plurality of slots including at least one of the SBFD slot or the uplink slot, in accordance with the indication of the plurality of FDRAs or the indication of multiple MCSs.

19. A network entity, comprising:

means for transmitting a single downlink control information, DCI, message scheduling a plurality of transmissions for communicating a plurality of transport blocks, TBs, wherein the single DCI message comprises:

frequency domain resource allocation, FDRA, information for a plurality of slot types, the single DCI message comprising an indication of a plurality of FDRAs for a plurality of slots including a first FDRA for a sub-band full duplex, SBFD, slot of the plurality of slots and a second FDRA for an uplink slot of the plurality of slots, wherein the indication comprises:

a FDRA bitfield, wherein a value of the FDRA bitfield maps to an associated FDRA pattern in a FDRA table of FDRA patterns, or two FDRA bitfields, wherein a first FDRA bitfield of the two FDRA bitfields comprises a first indication of the first FDRA for the SBFD slot, and a second FDRA bitfield of the two FDRA bitfields comprises a second indication of the second FDRA for the uplink slot, or modulation and coding scheme, MCS, information for the plurality of slot types, the single DCI message comprising an indication of multiple MCSs for a plurality of slots wherein the indication indicates a first MCS for a sub-band full duplex, SBFD, slot of the plurality of slots and a second MCS for an uplink slot of the plurality of slots, wherein the indication comprises two MCS bitfields, wherein a first MCS bitfield of the two MCS bitfields comprises a first indication of the first MCS for the SBFD slot and a second MCS bitfield of the two MCS bitfields comprises a second indication of the second MCS for the uplink slot; and means for communicating via the plurality of slots including at least one of the SBFD slot or the uplink slot, in accordance with the indication of the plurality of FDRAs or the indication of multiple MCSs.

20. A method for wireless communication performed by a user equipment, UE, comprising:

receiving a single downlink control information, DCI, message scheduling a plurality of transmissions for communicating a plurality of transport blocks, TBs, wherein the single DCI message comprises:

frequency domain resource allocation, FDRA, information for a plurality of slot types, the single DCI message comprising an indication of a plurality of FDRAs for a plurality of slots including a first FDRA for a sub-band full duplex, SBFD, slot of the plurality of slots and a second FDRA for an uplink slot of the plurality of slots, wherein the indication comprises two FDRA bitfields, wherein a first FDRA bitfield of the two FDRA bitfields comprises a first indication of the first FDRA for the SBFD slot, and a second FDRA bitfield of the two FDRA bitfields comprises a second indication of the second FDRA for the uplink slot, or modulation and coding scheme, MCS, information for the plurality of slot types, the single DCI message comprising an indication of multiple MCSs for a plurality of slots wherein the indication indicates a first MCS for a sub-band full duplex, SBFD, slot of the plurality of slots and a second MCS for an uplink slot of the plurality of slots, wherein the indication comprises two MCS bitfields, wherein a first MCS bitfield of the two MCS bitfields comprises a first indication of the first MCS for the SBFD slot and a second MCS bitfield of the two MCS bitfields comprises a second indication of the second MCS for the uplink slot; and communicating the plurality of TBs via the plurality of slots including at least one of the SBFD slot or the uplink slot, in accordance with the indication of the plurality of FDRAs or the indication of multiple MCSs.

21. The method of claim 20, wherein each of the plurality of transmissions is a physical uplink shared channel, PUSCH, transmission or a physical downlink shared channel, PDSCH, transmission.

22. A method for wireless communication performed by a network entity, comprising:

transmitting a single downlink control information, DCI, message scheduling a plurality of transmissions for communicating a plurality of transport blocks, TBs, wherein the single DCI message comprises:

frequency domain resource allocation, FDRA, information for a plurality of slot types, the single DCI message comprising an indication of a plurality of FDRAs for a plurality of slots including a first FDRA for a sub-band full duplex, SBFD, slot of the plurality of slots and a second FDRA for an uplink slot of the plurality of slots, wherein the indication comprises two FDRA bitfields, wherein a first FDRA bitfield of the two FDRA bitfields comprises a first indication of the first FDRA for the SBFD slot, and a second FDRA bitfield of the two FDRA bitfields comprises a second indication of the second FDRA for the uplink slot, or modulation and coding scheme, MCS, information for the plurality of slot types, the single DCI message comprising an indication of multiple MCSs for a plurality of slots wherein the indication indicates a first MCS for a sub-band full duplex, SBFD, slot of the plurality of slots and a second MCS for an uplink slot of the plurality of slots, wherein the indication comprises two MCS bitfields, wherein a first MCS bitfield of the two MCS bitfields comprises a first indication of the first MCS for the SBFD slot and a second MCS bitfield of the two MCS bitfields comprises a second indication of the second MCS for the uplink slot; and communicating via the plurality of slots including at least one of the SBFD slot or the uplink slot, in accordance with the indication of the plurality of FDRAs or the indication of multiple MCSs.

23. The method of claim 22, wherein each of the plurality of transmissions is a physical uplink shared channel, PUSCH, transmission or a physical downlink shared channel, PDSCH, transmission.

24. A method for wireless communication performed by a user equipment, UE, comprising:

receiving a single downlink control information, DCI, message scheduling a plurality of transmissions for communicating a plurality of transport blocks, TBs, wherein the single DCI message comprises frequency domain resource allocation, FDRA, information for a plurality of slot types, the single DCI message comprising an indication of a plurality of FDRAs for a plurality of slots including a first FDRA for a subband full duplex, SBFD, slot of the plurality of slots and a second FDRA for an uplink slot of the plurality of slots, wherein a first slot of the plurality of slots is an SBFD slot and the first FDRA is for a sub-band associated with the first slot; and communicating the plurality of TBs via the plurality of slots including at least one of the SBFD slot or the uplink slot, in accordance with the indication, wherein communicating the plurality of TBs in accordance with the indication comprises determining a new FDRA based on the first FDRA and an overlap of the first FDRA with available frequency resources in the sub-band.

25. The method of claim 24, wherein the indication comprises a FDRA bitfield and wherein a value of the FDRA bitfield maps to an associated FDRA pattern in a FDRA table of FDRA patterns.

26. The method of claim 24, wherein the indication comprises two FDRA bitfields, wherein a first FDRA bitfield of the two FDRA bitfields comprises a first indication of the first FDRA for the SBFD slot, and a second FDRA bitfield of the two FDRA bitfields comprises a second indication of the second FDRA for the uplink slot.

27. A user equipment for wireless communication, comprising:

means for receiving a single downlink control information, DCI, message scheduling a plurality of transmissions for communicating a plurality of transport blocks, TBs, wherein the single DCI message comprises frequency domain resource allocation, FDRA, information for a plurality of slot types, the single DCI message comprising an indication of a plurality of FDRAs for a plurality of slots including a first FDRA for a sub-band full duplex, SBFD, slot of the plurality of slots and a second FDRA for an uplink slot of the plurality of slots, wherein a first slot of the plurality of slots is the SBFD slot and the first FDRA is for a sub-band associated with the first slot; and means for communicating the plurality of TBs via the plurality of slots including at least one of the SBFD slot or the uplink slot, in accordance with the indication, wherein communicating the plurality of TBs in accordance with the indication comprises determining a new FDRA based on the first FDRA and an overlap of the first FDRA with available frequency resources in the sub-band.

28. The user equipment of claim 27, wherein each of the plurality of transmissions is a physical uplink shared channel, PUSCH, transmission or a physical downlink shared channel, PDSCH, transmission.

29. The user equipment of claim 27, wherein the indication comprises a FDRA bitfield and wherein a value of the FDRA bitfield maps to an associated FDRA pattern in a FDRA table of FDRA patterns.

30. The user equipment of claim 27, wherein the indication comprises two FDRA bitfields, wherein a first FDRA bitfield of the two FDRA bitfields comprises a first indication of the first FDRA for the SBFD slot, and a second FDRA bitfield of the two FDRA bitfields comprises a second indication of the second FDRA for the uplink slot.

* * * * *